(12) United States Patent
Lazarev et al.

(10) Patent No.: US 9,852,846 B2
(45) Date of Patent: Dec. 26, 2017

(54) SELF-HEALING CAPACITOR AND METHODS OF PRODUCTION THEREOF

(71) Applicant: Capacitor Sciences Incorporated, Menlo Park, CA (US)

(72) Inventors: Pavel Ivan Lazarev, Menlo Park, CA (US); Ian S. G. Kelly-Morgan, San Francisco, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 0 days.

(21) Appl. No.: 15/053,943

(22) Filed: Feb. 25, 2016

(65) Prior Publication Data

US 2016/0254092 A1  Sep. 1, 2016

Related U.S. Application Data

(60) Provisional application No. 62/121,328, filed on Feb. 26, 2015.

(51) Int. Cl.
*H01G 4/005* (2006.01)
*H01G 4/30* (2006.01)
(Continued)

(52) U.S. Cl.
CPC .............. *H01G 4/015* (2013.01); *C08G 69/32* (2013.01); *C08G 73/0266* (2013.01);
(Continued)

(58) Field of Classification Search
CPC .................................. H01G 4/228; H01G 4/30
(Continued)

(56) References Cited

U.S. PATENT DOCUMENTS 3,407,394 A   10/1968   Hartke
4,694,377 A    9/1987   MacDougall et al.
(Continued)

FOREIGN PATENT DOCUMENTS

CN   203118781 U   8/2013
DE    10203918 A1   8/2003
(Continued)

OTHER PUBLICATIONS

Center for Dielectric Studies, Janosik, et al., "Ultra-High Energy Density Capacitors Through Improved Glass Technology", pp. 1-5 Center for Dielectric Studies Penn State University, dated 2004.
(Continued)

*Primary Examiner* — Eric Thomas
(74) *Attorney, Agent, or Firm* — JDI Patent; Joshua Isenberg; Robert Pullman

(57) ABSTRACT

A self-healing capacitor comprises a first electrode, a second electrode, and a dielectric layer disposed between said first and second electrodes and having first surface faced the first electrode and second surface faced the second electrode. At least one of the electrodes can include metal foam. The dielectric layer can have electrically conductive channels that each has an exit point located on the first surface of the dielectric layer and another exit point located on the second surface of the dielectric layer. The electrodes can include local contact breakers each of which is located within the electrode at an interface between the dielectric layer and the electrode and opposite at least one exit point of each electrically conductive channel in the dielectric layer. The local contact breakers can prevent electric current through the conductive channels in dielectric layer.

45 Claims, 1 Drawing Sheet

(51) Int. Cl.
  *H01G 4/08* (2006.01)
  *H01G 4/015* (2006.01)
  *C09D 151/00* (2006.01)
  *H01G 4/008* (2006.01)
  *H01G 4/18* (2006.01)
  *C09D 179/02* (2006.01)
  *C08G 69/32* (2006.01)
  *C08G 73/02* (2006.01)
  *C08G 73/10* (2006.01)
  *C08G 73/14* (2006.01)
  *C08G 73/18* (2006.01)

(52) U.S. Cl.
  CPC ......... *C08G 73/1067* (2013.01); *C08G 73/14* (2013.01); *C08G 73/18* (2013.01); *C09D 151/003* (2013.01); *C09D 179/02* (2013.01); *H01G 4/008* (2013.01); *H01G 4/18* (2013.01)

(58) Field of Classification Search
  USPC ........................................................ 361/303
  See application file for complete search history.

(56) References Cited

U.S. PATENT DOCUMENTS

| | | | |
|---|---|---|---|
| 4,702,562 | A | 10/1987 | Scheuble et al. |
| 5,187,639 | A | 2/1993 | Ogawa et al. |
| 5,248,774 | A | 9/1993 | Dietz et al. |
| 5,384,521 | A | 1/1995 | Coe |
| 5,395,556 | A | 3/1995 | Drost et al. |
| 5,466,807 | A | 11/1995 | Dietz et al. |
| 5,514,799 | A | 5/1996 | Varanasi et al. |
| 5,581,437 | A | 12/1996 | Sebillotte et al. |
| 5,679,763 | A | 10/1997 | Jen et al. |
| 5,742,471 | A | 4/1998 | Barbee et al. |
| 5,840,906 | A | 11/1998 | Zoltewicz et al. |
| 5,880,951 | A | 3/1999 | Inaba |
| 6,282,081 | B1 | 8/2001 | Takabayashi et al. |
| 6,341,056 | B1 | 1/2002 | Allman et al. |
| 6,391,104 | B1 | 5/2002 | Schulz |
| 6,426,861 | B1 | 7/2002 | Munshi |
| 6,501,093 | B1 | 12/2002 | Marks |
| 6,798,642 | B2 | 9/2004 | Decker et al. |
| 7,025,900 | B2 | 4/2006 | Sidorenko et al. |
| 7,033,406 | B2 | 4/2006 | Weir et al. |
| 7,211,824 | B2 | 5/2007 | Lazarev |
| 7,460,352 | B2 | 12/2008 | Jamison et al. |
| 7,466,536 | B1 | 12/2008 | Weir et al. |
| 7,498,689 | B2 | 3/2009 | Mitani et al. |
| 7,579,709 | B2 | 8/2009 | Goetz et al. |
| 7,625,497 | B2 | 12/2009 | Iverson et al. |
| 7,837,902 | B2 | 11/2010 | Hsu et al. |
| 7,893,265 | B2 | 2/2011 | Facchetti et al. |
| 7,947,199 | B2 | 5/2011 | Wessling |
| 8,222,074 | B2 | 7/2012 | Lazarev |
| 8,231,809 | B2 | 7/2012 | Pschirer et al. |
| 8,236,998 | B2 | 8/2012 | Nagata et al. |
| 8,344,142 | B2 | 1/2013 | Marder et al. |
| 8,404,844 | B2 | 3/2013 | Kastler et al. |
| 8,552,179 | B2 | 10/2013 | Lazarev |
| 8,818,601 | B1 | 8/2014 | V et al. |
| 8,929,054 | B2 | 1/2015 | Felten et al. |
| 8,938,160 | B2 | 1/2015 | Wang |
| 9,056,676 | B1 | 6/2015 | Wang |
| 2002/0048140 | A1 | 4/2002 | Gallay et al. |
| 2003/0026063 | A1 | 2/2003 | Munshi |
| 2003/0102502 | A1 | 6/2003 | Togashi |
| 2003/0142461 | A1 | 7/2003 | Decker et al. |
| 2003/0219647 | A1 | 11/2003 | Wariishi |
| 2005/0118083 | A1 | 6/2005 | Tabuchi |
| 2006/0120014 | A1 | 6/2006 | Nakamura et al. |
| 2006/0120020 | A1 | 6/2006 | Dowgiallo |
| 2007/0108940 | A1 | 5/2007 | Sainomoto et al. |
| 2007/0159767 | A1 | 7/2007 | Jamison et al. |
| 2008/0002329 | A1 | 1/2008 | Pohm et al. |
| 2008/0266750 | A1 | 10/2008 | Wu et al. |
| 2008/0283283 | A1 | 11/2008 | Abe et al. |
| 2009/0040685 | A1 | 2/2009 | Hiemer et al. |
| 2009/0184355 | A1 | 7/2009 | Brederlow et al. |
| 2010/0038629 | A1 | 2/2010 | Lazarev |
| 2010/0178728 | A1 | 7/2010 | Zheng et al. |
| 2010/0183919 | A1 | 7/2010 | Holme et al. |
| 2010/0193777 | A1 | 8/2010 | Takahashi et al. |
| 2010/0214719 | A1 | 8/2010 | Kim et al. |
| 2010/0233491 | A1 | 9/2010 | Nokel et al. |
| 2010/0255381 | A1 | 10/2010 | Holme et al. |
| 2010/0309696 | A1 | 12/2010 | Guillot et al. |
| 2011/0079733 | A1 | 4/2011 | Langhals et al. |
| 2011/0079773 | A1 | 4/2011 | Wasielewski et al. |
| 2011/0110015 | A1 | 5/2011 | Zhang et al. |
| 2011/0228442 | A1 | 9/2011 | Zhang et al. |
| 2012/0008251 | A1 | 1/2012 | Yu et al. |
| 2012/0033342 | A1 | 2/2012 | Ito et al. |
| 2012/0053288 | A1 | 3/2012 | Morishita et al. |
| 2012/0056600 | A1 | 3/2012 | Nevin |
| 2012/0113380 | A1 | 5/2012 | Geivandov et al. |
| 2012/0122274 | A1 | 5/2012 | Lazarev |
| 2012/0244330 | A1 | 9/2012 | Sun et al. |
| 2012/0268862 | A1 | 10/2012 | Song et al. |
| 2012/0302489 | A1 | 11/2012 | Rodrigues et al. |
| 2013/0056720 | A1 | 3/2013 | Kim et al. |
| 2013/0194716 | A1 | 8/2013 | Holme et al. |
| 2013/0215535 | A1 | 8/2013 | Bellomo |
| 2013/0314839 | A1 | 11/2013 | Terashima et al. |
| 2013/0342967 | A1 | 12/2013 | Lai et al. |
| 2014/0035100 | A1 | 2/2014 | Cho |
| 2014/0036410 | A1 | 2/2014 | Okamatsu et al. |
| 2014/0098458 | A1 | 4/2014 | Almadhoun et al. |
| 2014/0185260 | A1 | 7/2014 | Chen et al. |
| 2014/0268490 | A1* | 9/2014 | Tsai .................. H01G 4/01 361/305 |
| 2014/0347787 | A1 | 11/2014 | Fathi et al. |
| 2015/0158392 | A1 | 6/2015 | Zhao |
| 2015/0162131 | A1 | 6/2015 | Felten et al. |
| 2015/0302990 | A1 | 10/2015 | Ghosh et al. |
| 2016/0020026 | A1 | 1/2016 | Lazarev |
| 2016/0020027 | A1 | 1/2016 | Lazarev |
| 2016/0254092 | A1 | 9/2016 | Lazarev et al. |
| 2016/0314901 | A1 | 10/2016 | Lazarev |
| 2016/0340368 | A1 | 11/2016 | Lazarev |
| 2016/0379757 | A1 | 12/2016 | Robinson et al. |

FOREIGN PATENT DOCUMENTS

| | | |
|---|---|---|
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0865142 B1 | 5/2008 |
| EP | 2062944 A1 | 5/2009 |
| EP | 2415543 A2 | 2/2012 |
| EP | 1486590 B1 | 12/2013 |
| EP | 2759480 A1 | 7/2014 |
| GB | 547853 A | 9/1942 |
| GB | 923148 A | 4/1963 |
| GB | 2084585 B | 11/1983 |
| JP | 2786298 B2 | 11/1991 |
| JP | H03253014 A | 11/1991 |
| JP | 2786298 B2 | 8/1998 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |
| WO | 0226774 A2 | 4/2002 |
| WO | 2007078916 A2 | 7/2007 |
| WO | 2008038047 A2 | 4/2008 |
| WO | 2011056903 A1 | 5/2011 |
| WO | 2012012672 A2 | 1/2012 |
| WO | 2012084536 A1 | 6/2012 |

(56) References Cited

FOREIGN PATENT DOCUMENTS

| WO | 2012122312 A1 | 9/2012 |
|---|---|---|
| WO | 2014009686 A1 | 1/2014 |
| WO | 2015003725 A1 | 1/2015 |

OTHER PUBLICATIONS

Congressional Research Service, Paul W. Parfomak, "Energy Storage for Power Grids and Electric Transportation: A Technology Assessment", pp. 87-94; Members and Committees of Congress; Mar. 27, 2012.
Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.
Department of Chemistry, Ho et al., "High dielectric constant polyanilinelpoly(acrylic acid) composites prepared by in situ polymerization", pp. 630-637; National Taiwan University, Taipei, Taiwan, ROC, Apr. 15, 2008.
Hindawi Publishing Corporation, Chavez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.
Hindawi Publishing Corporation, Gonzalez-Espasandin et al., "Fuel Cells: A Real Option for Unmanned Aerial Vehicles Propulsion", pp. 1-13, Torrefon de Ardoz, 28850 Madrid, Spain Jan. 30, 2014.
Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.
Institute of Transportation Studies, Burke, et al. "Review of the Present and Future Applications of Supercapacitors in Electric and Hybrid Vehicles", pp. 2-23 UC Davis ITS; Dec. 2014.
International Search Report and Written Opinion for International Application No. PCT/US2015/058890, dated Feb. 25, 2016.
International Search Report and Written Opinion for International Application No. PCT/US2015/030356, dated Jul. 28, 2015.
International Search Report and Written Opinion for International Application No. PCT/US2015/030415, dated Nov. 4, 2015.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
JACS Articles, Kang et. al., "Ultralarge Hyperpolarizability Twisted π-Electron System Electro-Optic Chromophores: Synthesis, Solid-State and Solution-Phase Structural Characteristics, Electronic Structures, Linear and Nonlinear Dptical Properties, and Computational Studies", pp. 3267-3286; Perugia, Italy Feb. 20, 2007.
Yue Wang, et. al., "Morphological and Dimensional Control via Hierarchical Assembly of Doped Oligoaniline Single Crystals", J. Am. Chem. Soc. 2012, 134, pp. 9251-9262.
Microelectronics Research and Communications Institute, Founders et al., "High-Voltage Switching Circuit for Nanometer Scale CMOS Technologies", pp. 1-4, University of Idaho, Moscow, ID 83843 USA, Apr. 30, 2007.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
Philosophical Transactions of the Royal Society, SIMON, "Charge storage mechanism in nanoporous carbons and its consequence for electrical double layer capacitors" pp. 3457-3467; Drexel University, Philadelphia, PA 19104, 2010.

R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.
RSC Publishing, Akl et al., "Molecular materials for switchable nonlinear optics in the solid state, based on ruthenium-nitrosyl complexes", pp. 3518-3527, Porto Alegre, Brazil; May 24, 2013.
U.S. Appl. No. 15/053,943, to Pavel Ivan Lazarev, et al., filed Mar. 14, 2016.
U.S. Appl. No. 15/090,509, to Pavel Ivan Lazarev, et al., filed Mar. 4, 2016.
U.S. Appl. No. 14/752,600, to Matthew R. Robinson, et al., filed Jun. 26, 2015.
U.S. Appl. No. 14/919,337, to Paul T. Furuta, et al., filed Oct. 21, 2015.
U.S. Appl. No. 14/931,757, to Pavel Ivan Lazarev, et al., filed Nov. 3, 2015.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 14/719,072, to Pavel Ivan Lazarev, filed May 21, 2015.
U.S. Appl. No. 15/043,315, to Ivan S.G. Kelley-Morgan, filed Feb. 12, 2016.
U.S. Appl. No. 62/318,134, to Pavel Ivan Lazarev, et al., filed Mar. 4, 2016.
U.S. Appl. No. 62/294,964, to Pavel Ivan Lazarev, et al., filed Feb. 12, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
Non-Final Office Action for U.S. Appl. No. 14/752,600, dated Jan. 23, 2017.
Non-Final Office Action for U.S. Appl. No. 14/919,337, dated Jan. 4, 2017.
Notice of Allowance for U.S. Appl. No. 14/710,491, dated Oct. 24, 2016.
PUBCHEM Open Chemistry Database, Compound Summary for CID 91001799. Mar. 17, 2015. pp. 1-10.
International Search Report and Written Opinion for International Application No. PCT/US2016/039395, dated Oct. 20, 2016.
International Search Report and Written Opinion for International Application No. PCT/US2016/019641, dated Jul. 12, 2016.
International Search Report and Written Opinion for International Application No. PCT/US2016/033628, dated Sep. 1, 2016.
Deily, Dielectric and Optical Characterization of Polar Polymeric Materials: Chromophore Entrained PMMA Thin Films, Thesis, 2008.
International Search Report and Written Opinion for International Application No. PCT/US2016/57765, dated Jan. 5 2017.
International Search Report and Written Opinion for International Application No. PCT/US2017/24150, dated Jun. 21, 2017.
Non-Final/Final Office Action for U.S. Appl. No. 15/043,247, dated Jun. 22, 2017.
Chao-Hsien Ho et al., "High dielectric constant polyaniline/poly(acrylic acid) composites prepared by in situ polymerization", Synthetic Metals, vol. 158, pp. 630-637 (2008).
Deruiter, J. Resonance and Induction Tutorial. Auburn University-Principles of Drug Action 1 Course Material. Spring 2005, 19 pages.
Final Office Action dated May 1, 2017.
Henna Ruuska et al., "A Density Functional Study on Dielectric Properties of Acrylic Acid Crafted Polypropylene", The Journal of Chemical Physics, vol. 134, p. 134904 (2011).
International Search Report and Written Opinion for International Application No. PCT/US2017/017146, dated May 11, 2017.
International Search Report and Written Opinion for International Application No. PCT/US2017/017150, dated May 18, 2017.

(56) References Cited

OTHER PUBLICATIONS

International Search Report and Written Opinion dated Jul. 12, 2016 for International Application No. PCT/US2016/019641, to Pavel Ivan Lazarev, filed Feb. 25, 2016.
Jaroslav Stejskal and Irina Sapurina, "Polyaniline: Thin Films and Colloidal Dispersions (IUPAC Technical Report)", Pure and Applied Chemistry, vol. 77, No. 5, pp. 815-826 (2005).
Non-Final Office Action dated Jun. 13, 2017 for U.S. Appl. No. 15/163,595.
Non-Final Office Action for U.S. Appl. No. 14/710,480, dated May 8, 2017.
Non-Final Office Action for U.S. Appl. No. 15/043,186, dated Jun. 2, 2017.
Roger D. Hartman and Herbert A. Pohl, "Hyper-electronic Polarization in Macromolecular Solids", Journal of Polymer Science: Part A-1, vol. 6, pp. 1135-1152 (1968).

* cited by examiner

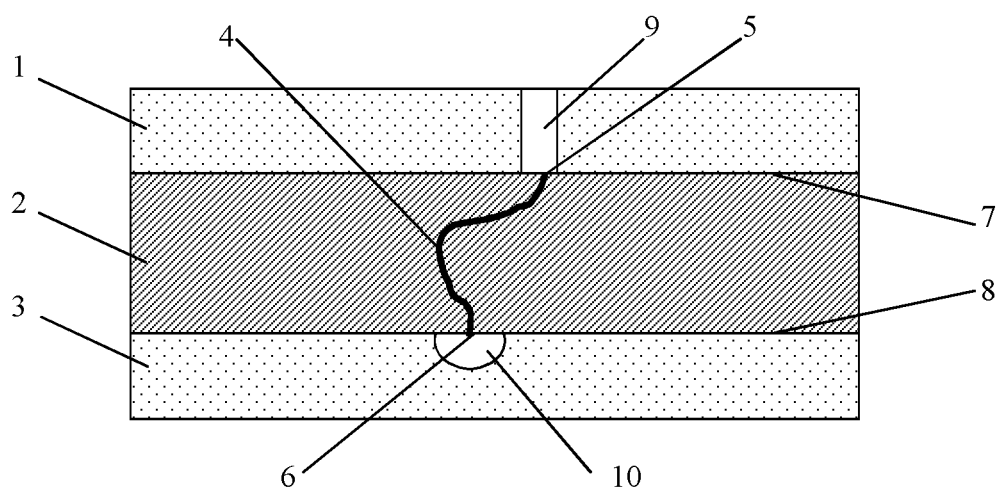

SELF-HEALING CAPACITOR AND METHODS OF PRODUCTION THEREOF

CLAIM OF PRIORITY

This application claims the priority benefit of U.S. Provisional Patent Application No. 62/121,328, to Pavel I. Lazarev, filed Feb. 26, 2015, the entire contents of which are incorporated herein by reference.

BACKGROUND

A capacitor is a passive electronic component that is used to store energy in the form of an electrostatic field, and comprises a pair of electrodes separated by a dielectric layer. When a potential difference exists between two electrodes, an electric field is present in the dielectric layer. An ideal capacitor is characterized by a single constant value of capacitance which is a ratio of the electric charge on each electrode to the potential difference between them. In practice, the dielectric layer located between electrodes may pass a small amount of leakage current. Electrodes and leads introduce an equivalent series resistance, and dielectric layer has limitation to an electric field strength which results in a breakdown voltage.

A characteristic electric field known as the breakdown strength $E_{bd}$, is an electric field in which the dielectric layer in a capacitor becomes conductive. Voltage at which this occurs is called the breakdown voltage of the device, and is given by the product of dielectric strength and separation (distance) d between the electrodes, $$V_{bd}=E_{bd}d \quad (1)$$

The maximal volumetric energy density stored in the capacitor is limited by the value proportional to $\sim \in \cdot E^2_{bd}$, where $\in$ is dielectric permittivity of the dielectric layer and $E_{bd}$ is breakdown dielectric strength. Thus, in order to increase the stored energy of the capacitor it is necessary to increase dielectric permeability $\in$ and breakdown dielectric strength $E_{bd}$ of the dielectric.

For high voltage applications, much larger capacitors can be used. There are a number of factors that can dramatically reduce the breakdown voltage. Geometry of the conductive electrodes is important for capacitor applications. In particular, sharp edges or points hugely increase the electric field strength locally and can lead to a local breakdown. Once a local breakdown starts at any point, the breakdown permeates through the dielectric layer and reaches the opposite electrode. Breakdown trace (electrically conductive channel) is conductive and causes a short circuit.

Breakdown of the dielectric layer usually occurs because intensity of an electric field becomes high enough to free electrons from atoms of the dielectric material and make them conduct an electric current from one electrode to another. Presence of impurities in the dielectric or imperfections (electric defects) of the crystal structure can result in an avalanche breakdown as observed in semiconductor devices. Thus, electrically conductive channels are formed in the dielectric layer when breakdown occurs. These channels have exit points on both surfaces of the dielectric layer.

Capacitors as energy storage device have well-known advantages versus electrochemical energy storage, e.g. a battery. Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for some applications, for example electric vehicles.

SUMMARY

The present disclosure provides self-healing capacitor and methods of production thereof. A self-healing capacitor of the present disclosure can solve a problem of increase of volumetric and mass density of reserved energy associated with some energy storage devices, and at the same time reduce cost of materials and manufacturing process.

In an aspect, a self-healing capacitor comprises a first electrode, a second electrode, and a dielectric layer disposed between said first and second electrodes and having first surface facing the first electrode and second surface facing the second electrode. At least one of the electrodes comprises metal foam. Said dielectric layer has a plurality of electrically conductive channels each of them having one exit point located on the first surface of the dielectric layer and another exit point located on the second surface of the dielectric layer. Each of said first and second electrodes comprises at least one local contact breaker adjacent to the dielectric layer and located opposite to at least one exit point that interferes with passage of electric current through the conductive channels in the dielectric layer. The electrodes are planar and can be nearly or substantially parallel to each other, though not necessarily flat. The electrodes can be off-set from a parallel configuration.

In another aspect, a method of producing a self-healing capacitor having at least one electrode made of metal foam, which comprises a) application of an electric voltage to capacitor electrodes and gradual enhancement of the magnitude of the voltage until electric breakdown of a dielectric layer will occur, b) formation under influence of electric field of electrically conductive channels which have exit points on both surfaces of the dielectric layer, c) formation of local contact breakers (through holes and dome structures) within electrode near these exit points due to the Joule heating of the metal by the current induced by the breakdown, d) extinguishing of the current when enough metal of the electrodes is evaporated around these exit points.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed descrip- FIG. 1 schematically shows a self-healing capacitor, in accordance with some embodiments of the present disclosure.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. Capacitors made of metalized polypropylene films suffer partial discharges due to weak electrical defects and have protective mechanism called self-healing. Self-healing occurs when a dielectric breakdown causes a large current density to flow into a fault, which heats a local electrode area and evaporates the metal. This event forms an electrical isolation at the breakdown site rather than forming a permanent short circuit, and allows the capacitor to continue operating with only a small loss of active area. Those defects can be destroyed by an electrical arc that extinguishes when enough metal of the electrodes is vaporized around this point. The volatilized area of self-healing is can be due to the Joule heating of the metal by the current pulse induced by the local breakdown, and the local discharge stops (arc extinction), although the voltage applied to the film remains constant, when the power density becomes lower than some critical power density.

Other important characteristic of a dielectric material is dielectric permittivity. Different types of dielectric materials are used for capacitors and include ceramics, polymer film such as polypropylene and polyester, paper, and electrolytic capacitors of different kinds. Increase of dielectric permittivity can provide an increase of volumetric energy density.

The present disclosure provides a self-healing capacitor. In one embodiment of the present invention, the first electrode has local contact breakers (discontinuities, irregularities) which are located within the first electrode on the border between the dielectric layer and the first electrode. These local contact breakers are located opposite to all exit points which are located on the first surface of the dielectric layer. The local contact breakers prevent an electric current through the conductive channels in dielectric layer. The second electrode has the local contact breakers (discontinuities, irregularities) which are located within the second electrode on the border between the dielectric layer and the second electrode. These local contact breakers are located opposite to all exit points which are located on the second surface of the dielectric layer. The local contact breakers prevent an electric current through the conductive channels in dielectric layer. The local contact breakers may be formed during the capacitor manufacturing process as part of a "burn-in" procedure or may be formed as a result of long term use of the capacitor.

A form of the local contact breaker can be selected from the list comprising a) a reach-through hole (gap, opening) which penetrate through whole thickness of the electrode and b) a dome structure located inside (within) the electrode on border with the dielectric layer.

Conductive channels are formed in the course of electrical breakdown of the dielectric layer due to an electric arc in the material of the dielectric layer. Formation of local contact breakers within electrode near the exit points is carry out due to the Joule heating of the metal by the current induced by the breakdown. In another embodiment of the present invention, the metal of the metal foam is Al, Ni, Fe, or Cu. Metal foam is a cellular structure consisting of a solid metal as well as a large volume fraction of gas-filled pores ("bubbles"). The pores can be sealed (closed-cell foam), or they can form an interconnected network (open-cell foam).

A characteristic of metal foams is that a very high porosity, for example, 75-95% of the volume, can consist of void spaces making these ultra-light materials. Metallic foams typically can some physical properties of their base material. Foam made from non-flammable metal can remain non-flammable and the foam can be recyclable back to its base material. Coefficient of thermal expansion will also remain similar while thermal conductivity can be reduced.

In another embodiment of the self-healing capacitor, a melting temperature of the metal foam is in the range about 400° C.-about 700° C. In yet another embodiment of the self-healing capacitor, metal content in the metal foam for electrode is in the range of about 5% to about 30% by volume. In some implementations, the resistivity of the metal foam may be tuned such that the metal foam ablates before the dielectric material when current flows in a conductive channel through the dielectric layer as a result of application of a voltage between the first electrode and second electrode. Tuning the resistivity is largely a matter of choice of metal and adjustment of porosity of the metal foam and the metal foam layer thickness.

In still another embodiment of the self-healing capacitor, the metal foam is of closed bubble type with maximum conductance per metal content. The dome structure located inside (within) the metal foam electrode on border with the dielectric layer is formed due to high temperature in the electric arc as a result of fusion and/or evaporation of the metal partition walls (partitions, dividers) separating bubbles in metal foam. Bubble coalescence is carried out due to high surface tension of liquid metal and high content of gas bubbles. Thus, bubble coalescence forms local contact breakers of a dome structure inside layer of foam electrode. The holes (gaps, openings) which penetrate through whole thickness of the metal foam electrode are formed due to evaporation of metal as a result of high temperature in the electric arc and due to high surface tension of liquid metal. In one embodiment of the present invention, the size, or the mean particle size, of the bubbles is in the range of about 100 nm to about 100,000 nm.

In another embodiment of the self-healing capacitor, the first electrode and the second electrode comprise metal foam. In another embodiment of the self-healing capacitor, the first electrode comprises the metal foam and the second electrode comprises a foil. In yet another embodiment of the self-healing capacitor, the metal of the foil is Aluminum (Al), Nickel (Ni), Iron (Fe), or Copper (Cu).

In another embodiment of the self-healing capacitor, the first electrode comprises the metal foam and the second electrode comprises a deposited thin film metal with thickness of the film in the range from about 20 nanometers (nm) to about 2000 nm. In another embodiment of the self-healing capacitor, the deposited thin film metal is Al, Ni, Fe, or Cu. The dome structures and holes (gaps, openings) in foils and in deposited metal thin film are formed as a result of fusion and/or evaporation of metal due to high temperature in the electric arc and due to high surface tension of liquid metal.

In one embodiment of the present invention, the dielectric layer is crystalline. The dielectric layer can be fabricated from any suitable crystalline material including a single crystal material, a batch crystal material, or amorphous material.

The dielectric layer can possess a different structure in the range between an amorphous and crystalline solid layer, depending on the material and manufacturing procedure used. In one embodiment of the disclosed self-healing capacitor, the dielectric layer comprises a material selected from oxides, nitrides, oxynitrides and fluorides. In another embodiment of the disclosed self-healing capacitor, the dielectric layer comprises a material selected from $SiO_2$, $HfO_2$, $Al_2O_3$ or $Si_3N_4$. In one embodiment of the disclosed self-healing capacitor, the dielectric layer comprises modified organic compounds of the general structural formula I: {Cor}(M)$_n$, (I) where Cor is a polycyclic organic compound with conjugated π-system, M a modifying functional group; and n is the number of the modifying functional groups that is greater than or equal to zero. In another embodiment of the present invention, the polycyclic organic compound is oligophenyl, imidazole, pyrazole, acenaphthene, triaizine, or indanthrone. Non-limiting examples are given in Table 1.

TABLE 1

Examples of the polycyclic organic compound for the dielectric layer

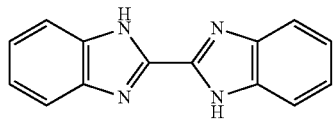 [SMILES: c1ccc2[nH]c(-c3nc4ccccc4[nH]3)nc2c1]

1

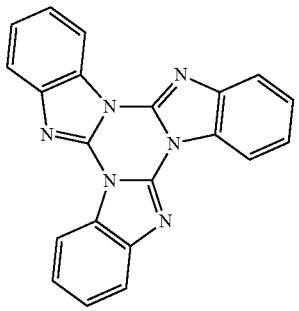 [SMILES: c1ccc2c(c1)nc1n2c2nc3ccccc3n2c2nc3ccccc3n12]

2

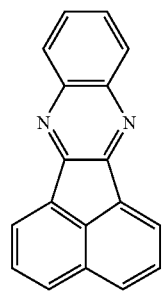 [SMILES: c1cc2c3c(cccc3c1)-c1nc3ccccc3nc1-2]

3

4

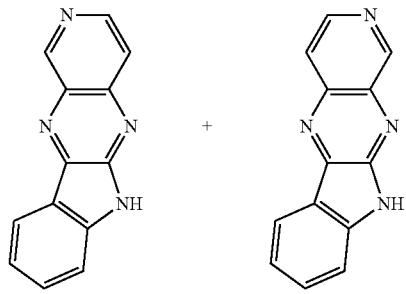 [SMILES: c1ccc2c(c1)[nH]c1nc3ccncc3nc12 ; c1ccc2c(c1)[nH]c1nc3cnccc3nc12]

5

TABLE 1-continued
Examples of the polycyclic organic compound for the dielectric layer
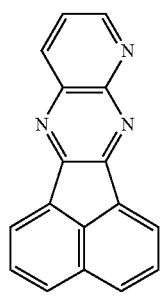 [SMILES: c1cc2c3c(cccc3c1)-c1nc3ncccc3nc1-2]
6
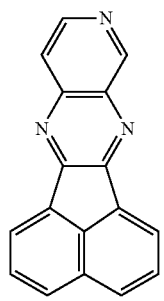 [SMILES: c1cc2c3c(cccc3c1)-c1nc3cnccc3nc1-2]
7
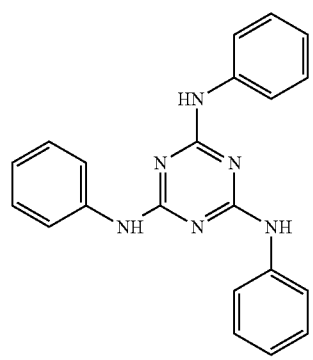 [SMILES: c1ccc(Nc2nc(Nc3ccccc3)nc(Nc3ccccc3)n2)cc1]
8
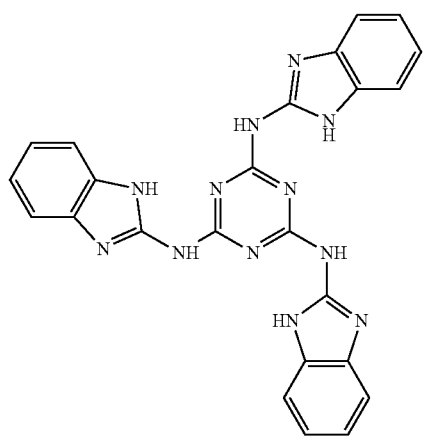 [SMILES: c1ccc2[nH]c(Nc3nc(Nc4nc5ccccc5[nH]4)nc(Nc4nc5ccccc5[nH]4)n3)nc2c1]
9
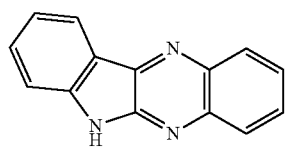 [SMILES: c1ccc2nc3c(nc2c1)[nH]c1ccccc13]
10

TABLE 1-continued
Examples of the polycyclic organic compound for the dielectric layer
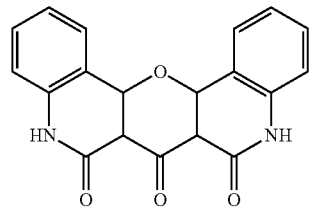 [SMILES: O=C1Nc2ccccc2C2OC3c4ccccc4NC(=O)C3C(=O)C12]
11
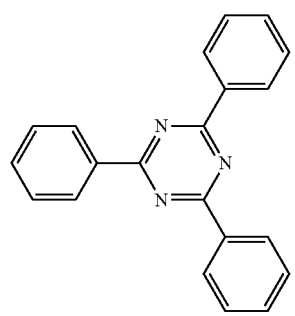 [SMILES: c1ccc(-c2nc(-c3ccccc3)nc(-c3ccccc3)n2)cc1]
12
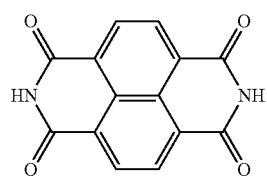 [SMILES: O=C1NC(=O)c2ccc3c4c(ccc1c24)C(=O)NC3=O]
13
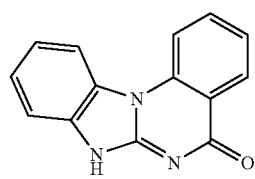 [SMILES: O=c1nc2[nH]c3ccccc3n2c2ccccc12]
14
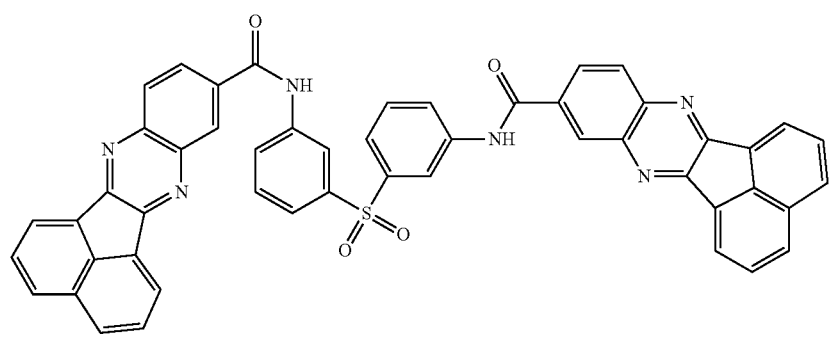 [SMILES: O=C(Nc1cccc(S(=O)(=O)c2cccc(NC(=O)c3ccc4nc5c(nc4c3)-c3cccc4cccc-5c34)c2)c1)c1ccc2nc3c(nc2c1)-c1cccc2cccc-3c12]
15
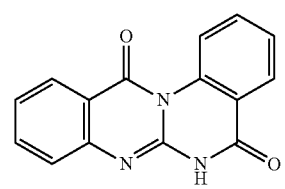 [SMILES: O=c1[nH]c2nc3ccccc3c(=O)n2c2ccccc12]
16

TABLE 1-continued
Examples of the polycyclic organic compound for the dielectric layer
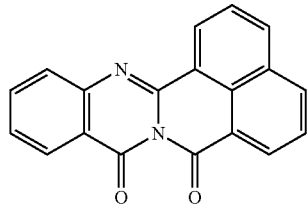 [SMILES: O=c1c2ccccc2nc2c3cccc4cccc(c(=O)n12)c43]
17
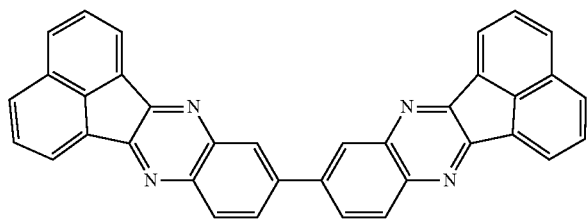 [SMILES: c1cc2c3c(cccc3c1)-c1nc3cc(-c4ccc5nc6c(nc5c4)-c4cccc5cccc-6c45)ccc3nc1-2]
18
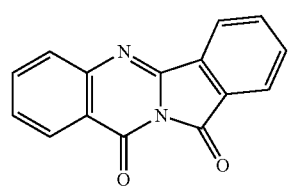 [SMILES: O=C1c2ccccc2-c2nc3ccccc3c(=O)n21]
19
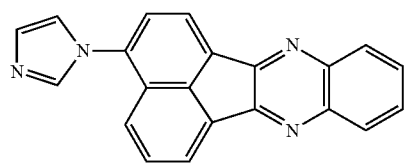 [SMILES: c1ccc2nc3c(nc2c1)-c1cccc2c(-n4ccnc4)ccc-3c12]
20
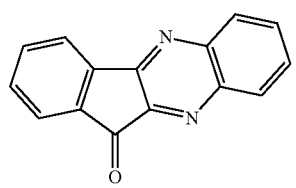 [SMILES: O=C1c2ccccc2-c2nc3ccccc3nc21]
21
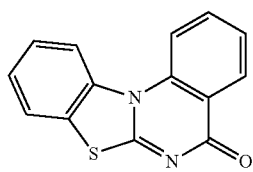 [SMILES: O=c1nc2sc3ccccc3n2c2ccccc12]
22
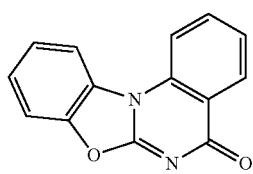 [SMILES: O=c1nc2oc3ccccc3n2c2ccccc12]
23
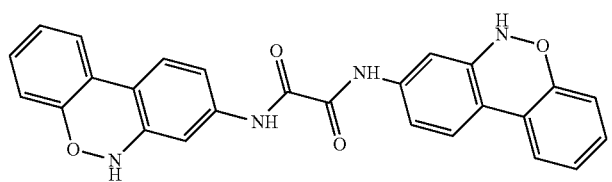 [SMILES: O=C(Nc1ccc2c(c1)NOc1ccccc1-2)C(=O)Nc1ccc2c(c1)NOc1ccccc1-2]
24

TABLE 1-continued
Examples of the polycyclic organic compound for the dielectric layer
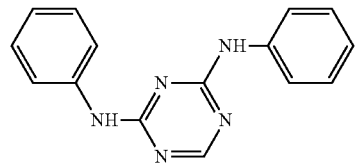 [SMILES: c1ccc(Nc2ncnc(Nc3ccccc3)n2)cc1]
25
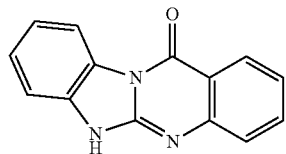 [SMILES: O=c1c2ccccc2nc2[nH]c3ccccc3n12]
26
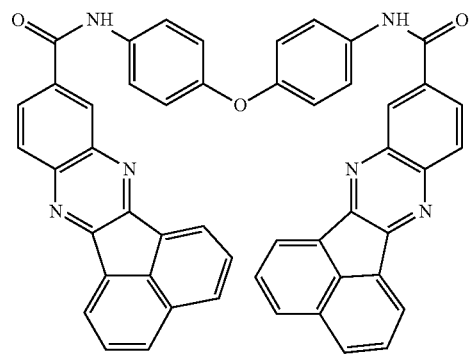 [SMILES: O=C(Nc1ccc(Oc2ccc(NC(=O)c3ccc4nc5c(nc4c3)-c3cccc4cccc-5c34)cc2)cc1)c1ccc2nc3c(nc2c1)-c1cccc2cccc-3c12]
27
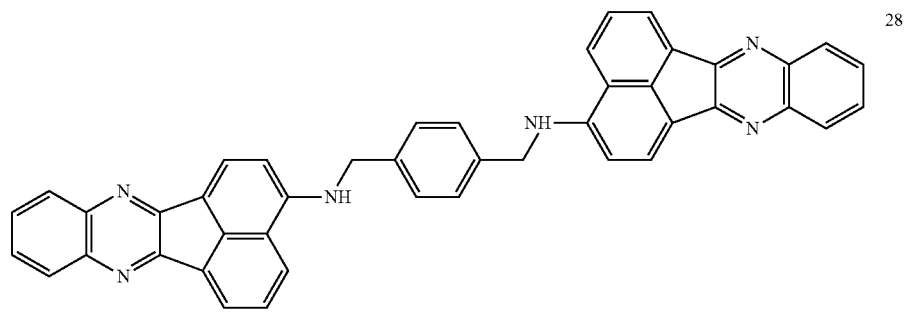
28
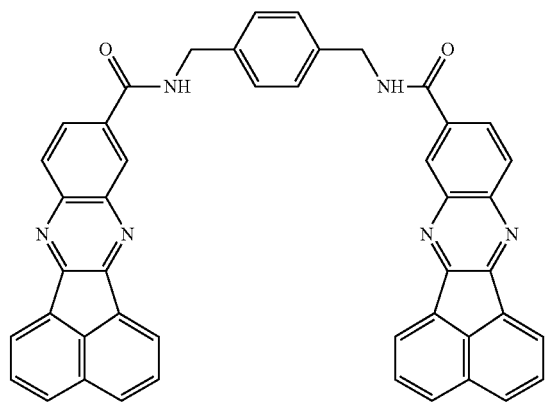 [SMILES: O=C(NCc1ccc(CNC(=O)c2ccc3nc4c(nc3c2)-c2cccc3cccc-4c23)cc1)c1ccc2nc3c(nc2c1)-c1cccc2cccc-3c12]
29

TABLE 1-continued
Examples of the polycyclic organic compound for the dielectric layer
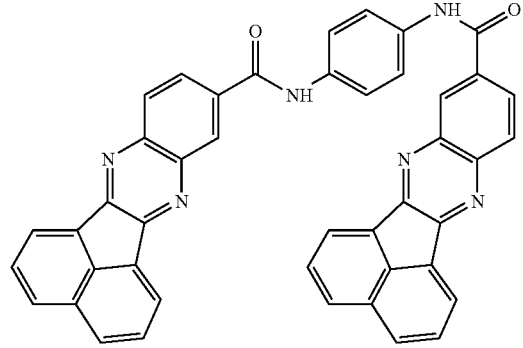 [SMILES: O=C(Nc1ccc(NC(=O)c2ccc3nc4c(nc3c2)-c2cccc3cccc-4c23)cc1)c1ccc2nc3c(nc2c1)-c1cccc2cccc-3c12]
30
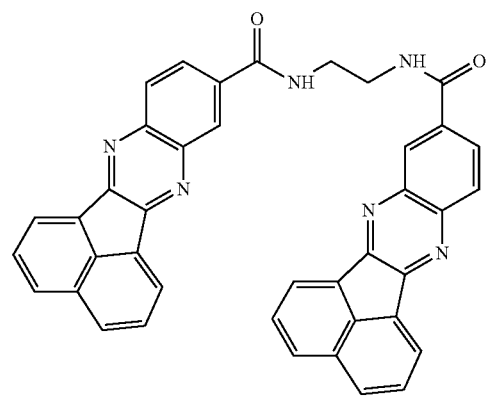 [SMILES: O=C(NCCNC(=O)c1ccc2nc3c(nc2c1)-c1cccc2cccc-3c12)c1ccc2nc3c(nc2c1)-c1cccc2cccc-3c12]
31
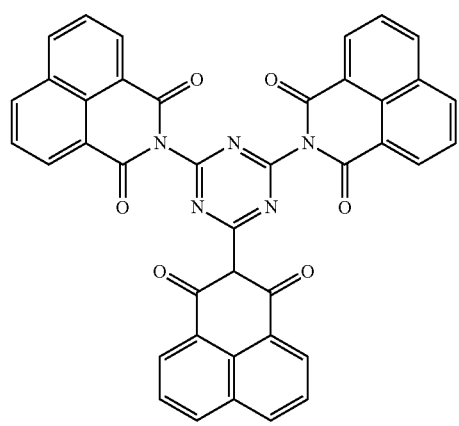 [SMILES: O=C1c2cccc3cccc(c23)C(=O)C1c1nc(N2C(=O)c3cccc4cccc(c34)C2=O)nc(N2C(=O)c3cccc4cccc(c34)C2=O)n1]
32

TABLE 1-continued
Examples of the polycyclic organic compound for the dielectric layer
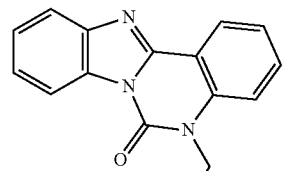  33
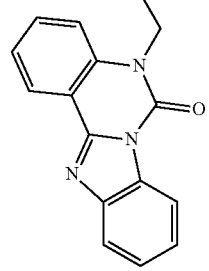  34
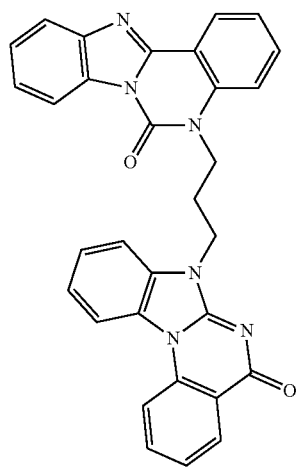 [SMILES: O=c1nc2n(CCCn3c(=O)n4c5ccccc5nc4c4ccccc43)c3ccccc3n2c2ccccc12]  35
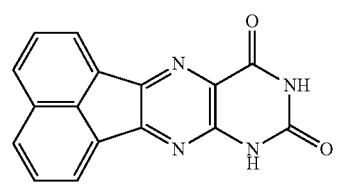 [SMILES: O=c1[nH]c(=O)c2nc3c(nc2[nH]1)-c1cccc2cccc-3c12]  36
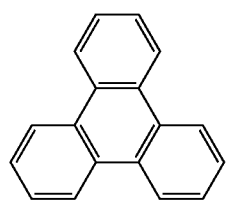 [SMILES: c1ccc2c(c1)c1ccccc1c1ccccc21]
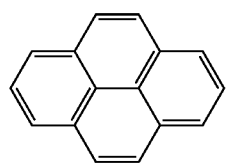 [SMILES: c1cc2ccc3cccc4ccc(c1)c2c34]  37

TABLE 1-continued

Examples of the polycyclic organic compound for the dielectric layer

| | |
|---|---|
| 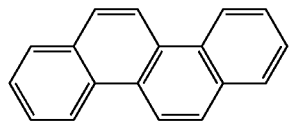 [SMILES: c1ccc2c(c1)ccc1c3ccccc3ccc21] | 38 |
| 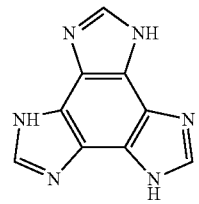 [SMILES: c1nc2c([nH]1)c1nc[nH]c1c1nc[nH]c21] | 39 |
| 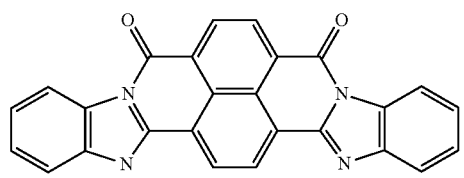 | 40 |
| 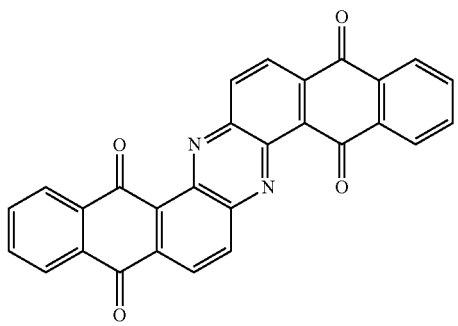 [SMILES: O=c1c2ccccc2c(=O)c2c1ccc1nc3c(ccc4c(=O)c5ccccc5c(=O)c43)nc12] | 41 |

In another embodiment of the present invention, the polycyclic organic compound is an arylene dye of the following formula:

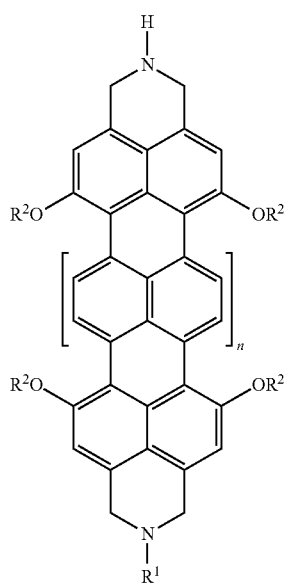

wherein n is equal to 0, 1, 2, 3, 4, 5, or 6, $R^1$ is diisopropylphenyl, and $R^2$ is tert-octylphenyl. In another embodiment of the present invention, the modifying functional groups are alkyl, aryl, substituted alkyl, substituted aryl, or any combination thereof. The modifying functional groups provide solubility of organic compounds at the stage of manufacturing and additional insulating properties to the dielectric layer of the self-healing capacitor. In another embodiment of the present invention, the dielectric layer comprises a polymeric material such as fluorinated alkyl, polyethylene, Poly-paraphenylene terephthalamide, poly(vinylidene fluoride-hexafluoropropylene), polypropylene, fluorinated polypropylene, or polydimethylsiloxane. In another embodiment of the present invention, the dielectric layer comprises a polymeric material comprising a polymer having a repeat group of Table 2.

TABLE 2

Examples of the water-soluble polymers for the dielectric layer

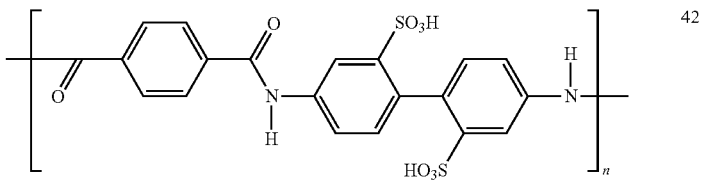

poly(2,2'-disulfo-4,4'-benzidine terephthalamide)

42

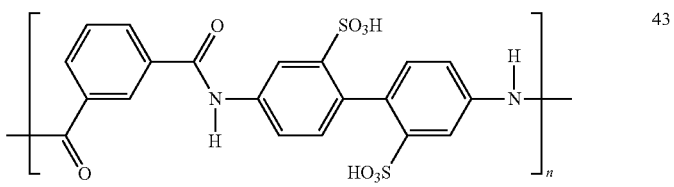

poly(2,2'-disulfo-4,4'-benzidine isophthalamide)

43

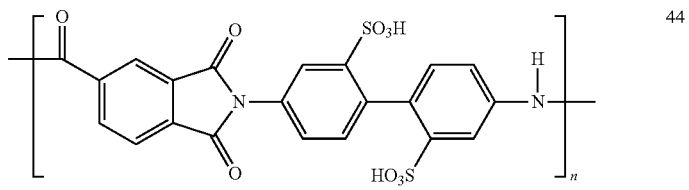

poly(2,2'-disulfo-4,4'-benzidine 1,3-dioxo-isoindoline-5-carboxamide)

44

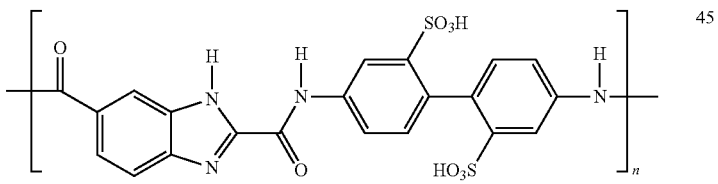

poly(2,2'-disulfo-4,4'-benzidine 1H-benzimidazole-2,5-dicarboxamide)

45

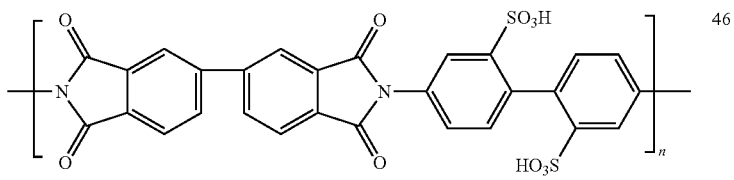

poly(2,2'-disulfo-4,4'-benzidine 3,3',4,4'-biphenyl tetracarboxylic acid diimide)

46

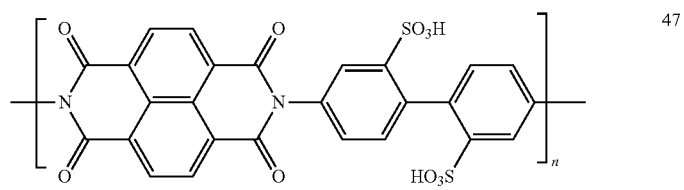

poly(2,2'disulpho-4,4'benzidine 1,4,5,8-naphtalen tetracarboxylic acid diimide)

47

In another embodiment of the present invention, the dielectric layer comprises a polymeric material comprising a repeat group of Table 3.

relation to the electrode surface. Non-limiting examples of repeat groups for an electro-conductive oligomer are given in Table 4.

TABLE 3

Examples of the polymers soluble in organic solvents for the dielectric layer

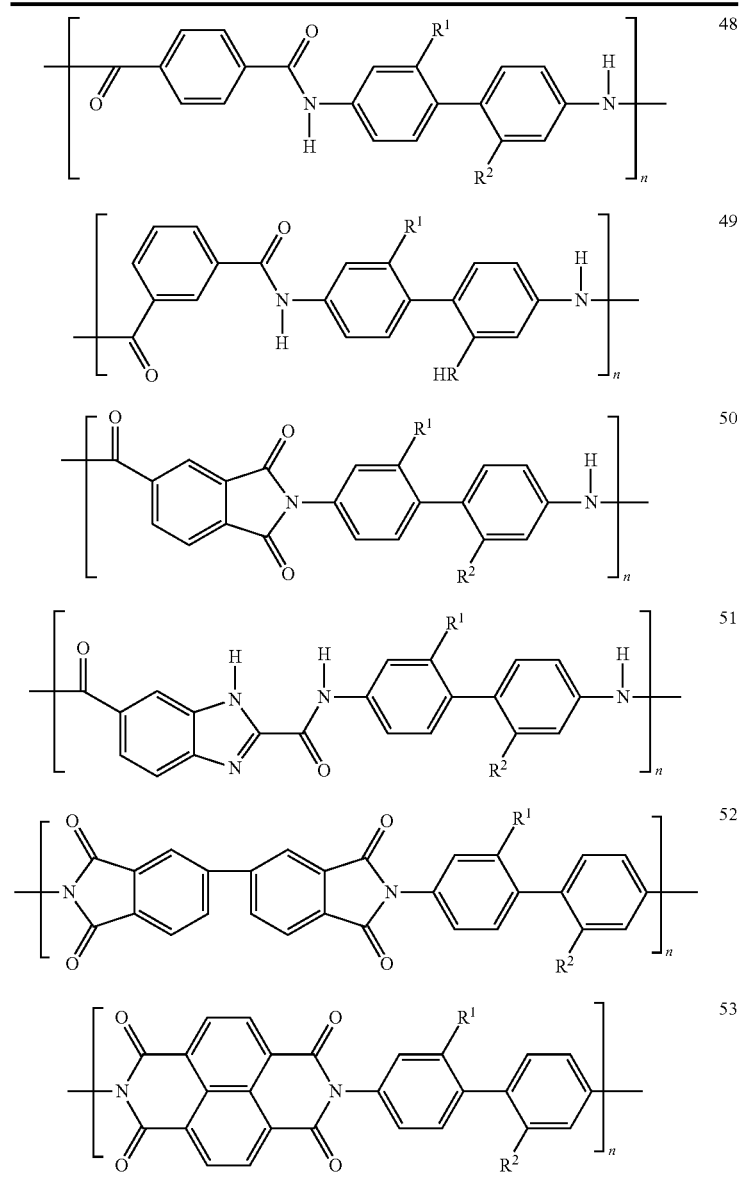

wherein the modifying functional groups $R^1$ and $R^2$ are independently alkyl, aryl, substituted alkyl, substituted aryl, or any combination thereof.

In one embodiment of the present invention, the dielectric layer is at least partly, wholly or substantially wholly crystalline. As an alternative, the dielectric layer is amorphous. In one embodiment of the present invention, the dielectric layer comprises a colloidal composite with a micro-dispersion of electro-conductive nano-particles in an insulator matrix. In another embodiment of the present invention, the electro-conductive nano-particles comprise an electro-conductive oligomer. In yet another embodiment of the present invention, the longitudinal axes of the electro-conductive oligomers are directed predominantly perpendicularly in

TABLE 4

Examples of the electro-conductive oligomers for the dielectric layer

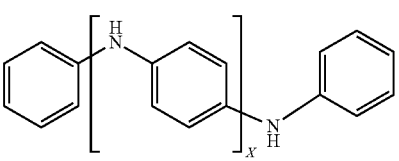

TABLE 4-continued

Examples of the electro-conductive oligomers for the dielectric layer

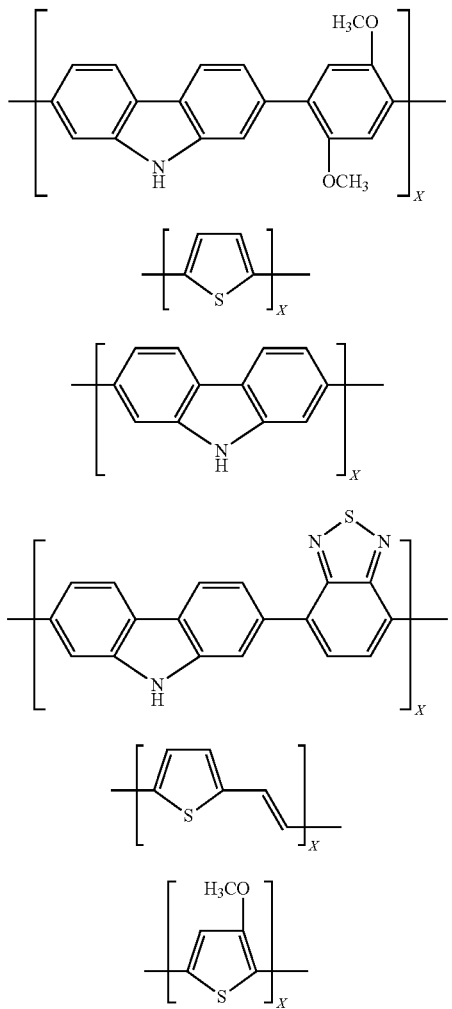

wherein X=2, 3, 4, 5, 6, 7, 8, 9, 10, 11, or 12. In another embodiment of the disclosed self-healing capacitor, the electroconductive oligomer further comprises substitute groups and is described by the following general structural formula II:

(electroconductive oligomer)-$R_q$, (II)

wherein $R_q$ is a set of substitute groups, and q is a number of the substitute groups R in the set $R_q$, and q is a number that is greater than or equal to zero. In yet another embodiment of the self-healing capacitor, the substitute groups R are independently alkyl, aryl, substituted alkyl, substituted aryl, or any combination thereof. In another embodiment of the self-healing capacitor, a material of the insulator matrix is poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyldicloro siloxane, dimethylsilane diol, or polydimethyl siloxane. These compounds can serve as a stabilizer, protecting the electro-conductive nano-particles from macroscopic aggregation.

In another embodiment of the present invention, a dielectric layer comprises a surfactant such as dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, and dobecyldimethylamine oxide.

In one embodiment of the present invention, the electrically conductive channel is characterized by electric defects united together due to breakdown of the dielectric layer. In another embodiment of the present invention, the electrode comprising metal foam serves as a carrying element of the capacitor since the metal foam has a high stiffness.

The present invention also provides a method of producing the self-healing capacitor as disclosed hereinabove.

FIG. 1 shows an embodiment of the disclosed self-healing capacitor that includes first electrode 1, dielectric layer 2, second electrode 3, electrically conductive channel 4, an exit point 5, another exit point 6, first surface of the dielectric layer 7, second surface of the dielectric layer 8, through hole (opening) 9 and dome structure inside electrode 10.

Example 1

In this embodiment of the present invention, the dielectric layer comprises a composite of polyaniline, PANI-DBSA/PAA, synthesized using in situ polymerization of aniline in an aqueous dispersion of poly-acrylic acid (PAA) in the presence of dodecylbenzene sulfonate (DBSA). The thickness of the dielectric layer is equal to 50 μm. The composite of polyaniline, PANI-DBSA/PAA has the dielectric permittivity equal to 100,000. The electrodes are made of metal foam comprising aluminum (Al). The thickness of these electrodes is equal to 10 nm. Melting temperature of foam is about 400° C. and metal content in the foam for these electrodes is about 30% by weight. The foam is of closed bubble type with maximum conductance per metal content. The size of the bubbles is in the range of about 100 nm to about 100,000 nm.

Example 2

In this embodiment of the present invention, the dielectric layer comprises a composite of polyaniline, PANI-DBSA/PAA, synthesized using in situ polymerization of aniline in an aqueous dispersion of poly-acrylic acid (PAA) in the presence of dodecylbenzene sulfonate (DBSA). The thickness of the dielectric layer is equal to 50 μm. The composite of polyaniline, PANI-DBSA/PAA has a dielectric permittivity equal to 100,000. The first electrode is made of metal foam comprising aluminum (Al). The thickness of this electrode is equal to 10 nm. The second electrode is made of metal foil comprising aluminum (Al). The thickness of this electrode is equal to 10 nm. Melting temperature of foam is around 400° C. and metal content in the foam for these electrodes is about 30% by weight. The foam is of closed bubble type with maximum conductance per metal content. The size of the bubbles can be in the range of about 100 nanometers (nm) to 100,000 nm.

Example 3

In this embodiment of the present invention, the dielectric layer comprises a composite of polyaniline, PANI-DBSA/PAA, synthesized using in situ polymerization of aniline in an aqueous dispersion of poly-acrylic acid (PAA) in the presence of dodecylbenzene sulfonate (DBSA). The thickness of the dielectric layer is equal to 50 μm. The composite of polyaniline, PANI-DBSA/PAA has the dielectric permittivity equal to 100,000. The first electrode is made of metal foam comprising aluminum (Al). The thickness of this electrode is equal to 10 nm. The second electrode is made of deposited thin film metal comprising aluminum (Al). The thickness of this electrode is equal to 10 nm. Melting temperature of foam is around 400° C. and metal content in the foam for these electrodes is about 30% by weight. The foam is of closed bubble type with maximum conductance per metal content. The size of the bubbles is in the range of about 100 nm to about 100,000 nm.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A self-healing capacitor comprising
a first electrode,
a second electrode, and
a dielectric layer disposed between said first and second electrodes and having first surface facing the first electrode and a second surface facing the second electrode,
wherein at least one of the electrodes comprises a metal foam, wherein the metal foam is configured to form contact breaker by way of metal evaporation at an end of a conductive channel in the dielectric layer when current flows in the conductive channel as a result of application of a voltage between the first electrode and second electrode.

2. A self-healing capacitor according to claim 1, wherein said dielectric layer comprises a plurality of electrically conductive channels, each of said channels having one exit point located on the first surface of the dielectric layer and another exit point located on the second surface of the dielectric layer, and
wherein each of said first and second electrodes comprises at least one local contact breaker adjacent to the dielectric layer and located opposite to at least one exit point that interferes with passage of electric current through the conductive channels in the dielectric layer.

3. A self-healing capacitor according to claim 2, wherein the at least one local contact breaker is a hole that penetrates an entire thickness of a respective one of the first and second electrodes.

4. A self-healing capacitor according to claim 2, wherein the at least one local contact breaker is a dome structure.

5. A self-healing capacitor according to claim 2, wherein the electrically conductive channel includes electric defects united together due to breakdown of the dielectric layer.

6. A self-healing capacitor according to claim 1, wherein the metal foam includes Aluminum (Al).

7. A self-healing capacitor according to claim 1, wherein the metal foam includes Nickel (Ni).

8. A self-healing capacitor according to claim 1, wherein the metal foam includes Iron (Fe).

9. A self-healing capacitor according to claim 1, wherein the metal foam includes Copper (Cu).

10. A self-healing capacitor according to claim 1, wherein a melting temperature of the metal foam is from about 400° C. to about 700° C.

11. A self-healing capacitor according to claim 1, wherein a metal content in the metal foam is from about 5% to about 30% by weight.

12. A self-healing capacitor according to claim 1, wherein the metal foam is of a closed bubble type.

13. A self-healing capacitor according to claim 1, wherein the first electrode comprises the metal foam and the second electrode comprises a foil.

14. A self-healing capacitor according to claim 13, wherein the foil includes Aluminum (Al).

15. A self-healing capacitor according to claim 13, wherein the foil includes Nickel (Ni).

16. A self-healing capacitor according to claim 13, wherein the foil includes Iron (Fe).

17. A self-healing capacitor according to claim 13, wherein the foil includes Copper (Cu).

18. A self-healing capacitor according to claim 1, wherein the first electrode comprises the metal foam and the second electrode comprises a deposited thin film metal.

19. A self-healing capacitor according to claim 18, wherein the deposited thin film metal includes Aluminum (Al).

20. A self-healing capacitor according to claim 18, wherein the deposited thin film metal includes Nickel (Ni).

21. A self-healing capacitor according to claim 18, wherein the deposited thin film metal includes Fe.

22. A self-healing capacitor according to claim 18, wherein the deposited thin film metal includes Cu.

23. A self-healing capacitor according to claim 1, wherein the resistivity of the metal foam is tuned such that the metal foam ablates before the dielectric layer when current flows in a conductive channel through the dielectric layer as a result of application of a voltage between the first electrode and second electrode.

24. A self-healing capacitor according to claim 1, wherein the dielectric layer comprises modified organic compounds of the general structural formula I:

$$\{Cor\}(M)_n,\qquad (I)$$

wherein Cor is a polycyclic organic compound with conjugated π-system, each M is a modifying functional group; and n is a number of the modifying functional groups that is greater than or equal to zero.

25. A self-healing capacitor according to claim 24 wherein the modifying functional groups are selected from the group consisting of alkyl, aryl, substituted alkyl, and substituted aryl.

26. A self-healing capacitor according to claim 24, wherein the polycyclic organic compound includes a material with the following structure:

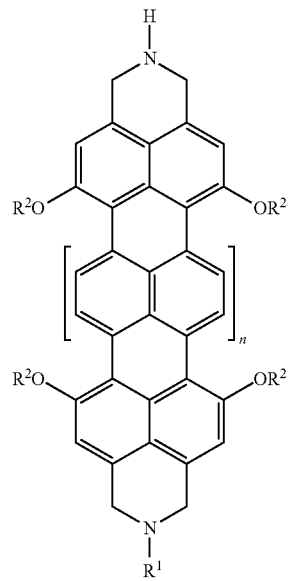

wherein n is a number ranging from 1-6, $R^1$ is diisopropylphenil, and $R^2$ is tert-octyphenil.

27. A self-healing capacitor according to claim 24, wherein the polycyclic organic compound is selected from the group consisting of oligophenyl, imidazole, pyrazole, acenaphthene, triaizine, indanthrone and structures 1-41:
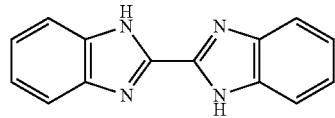
1
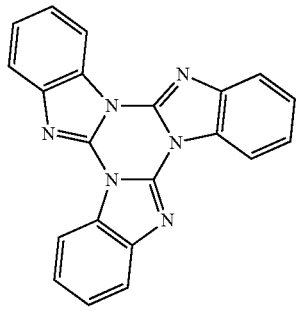
2
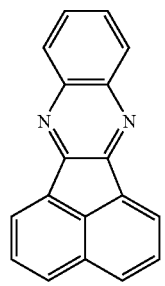
3
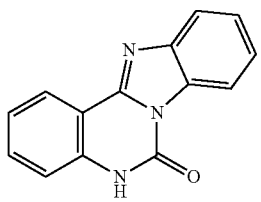
4
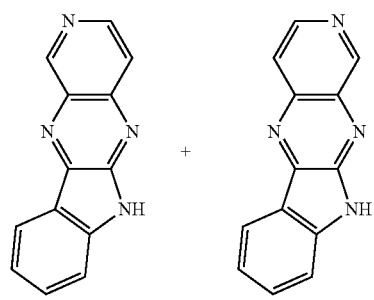
5
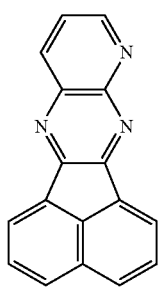
6
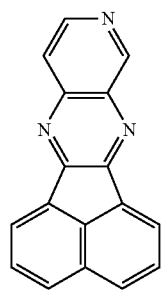
7
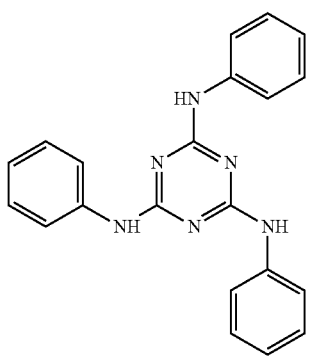
8

-continued
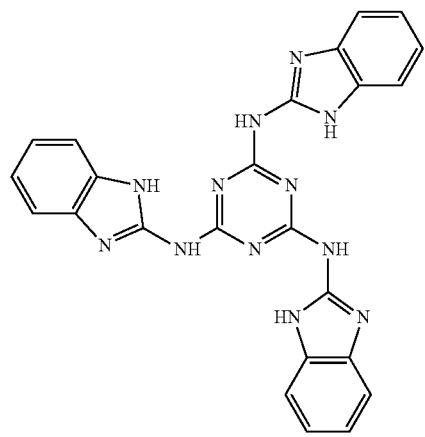
9
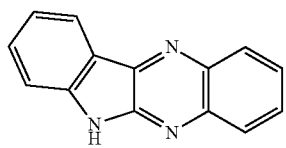
10
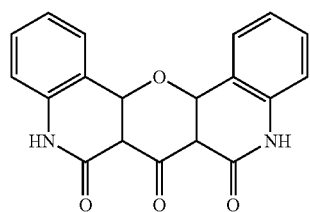
11
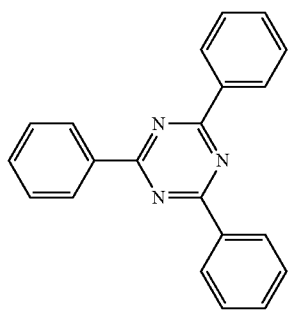
12
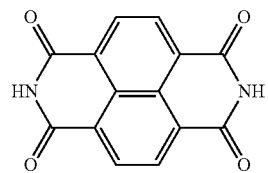
13
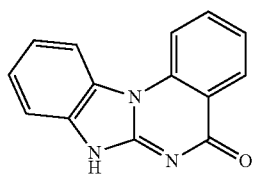
14
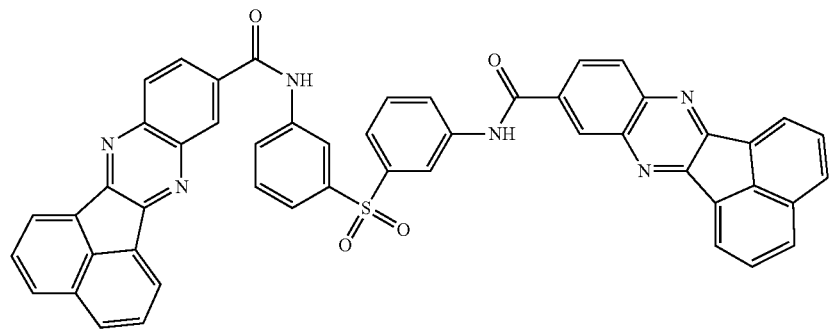
15
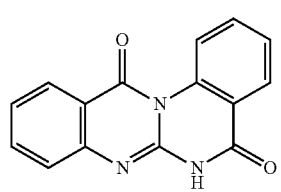
16
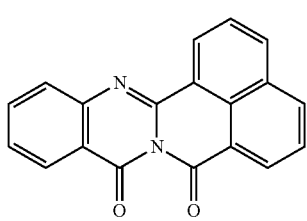
17

-continued
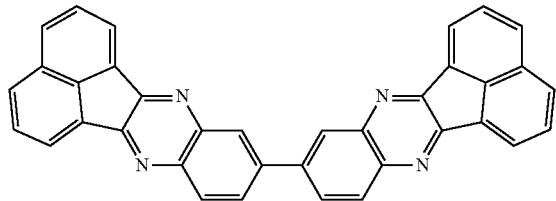
18
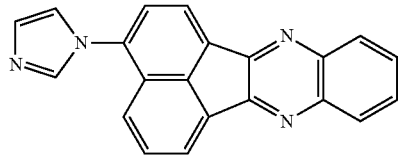
20
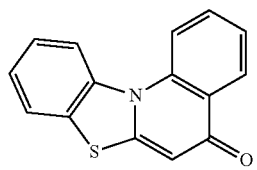
22
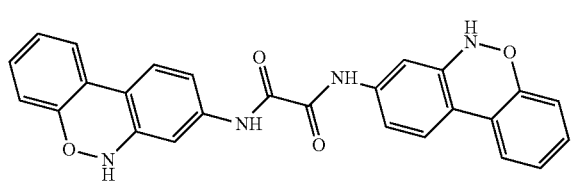
24
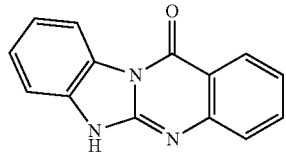
26
19
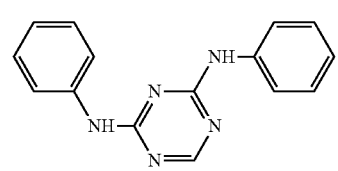
21
23
25
27
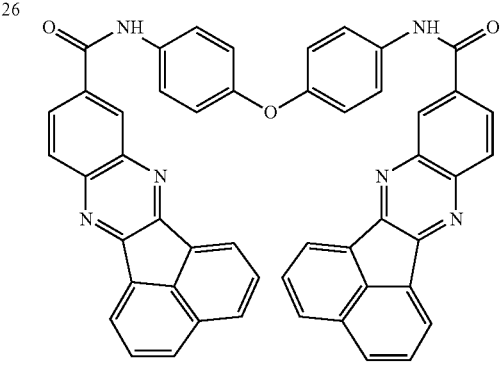
28
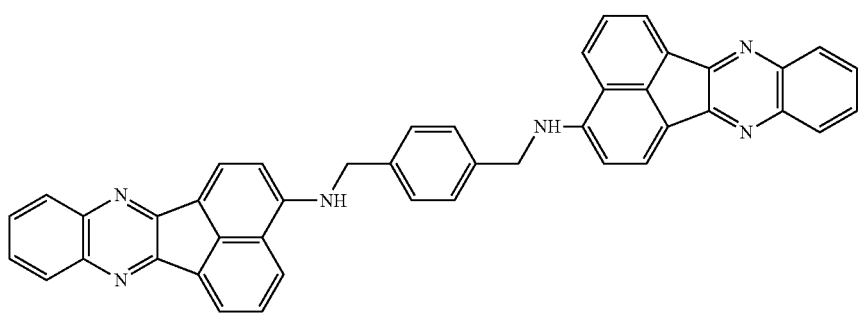

-continued
| 29 | 30 |
|---|---|
| 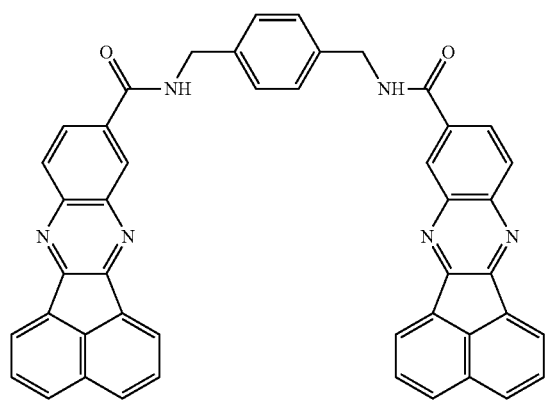 | 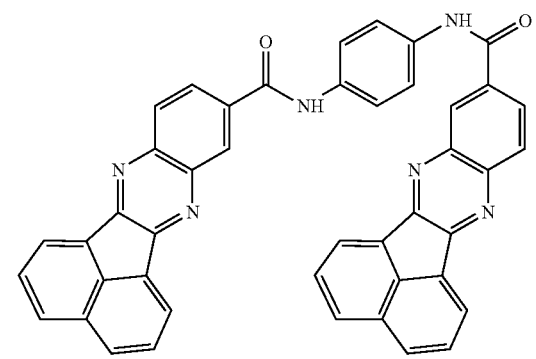 |
| 31 | 32 |
| 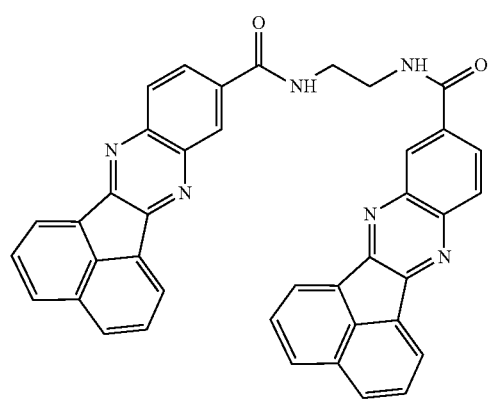 | 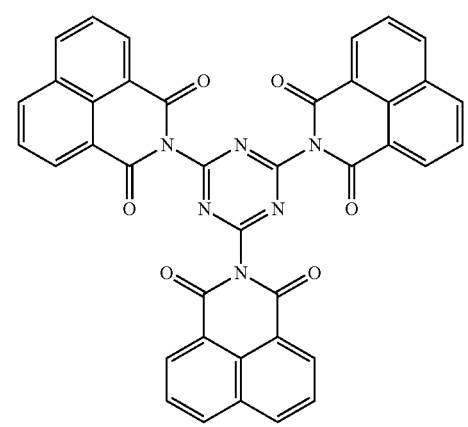 |
| 33 | 34 |
| 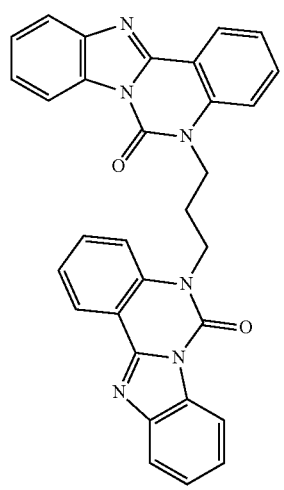 | 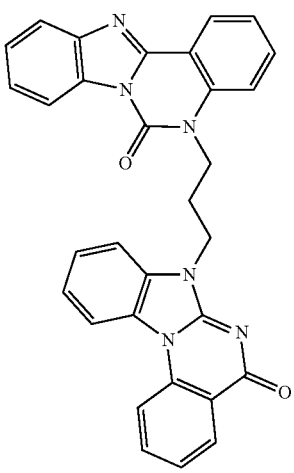 |
| 35 | 36 |
| 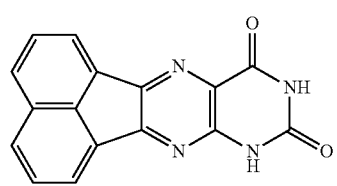 | 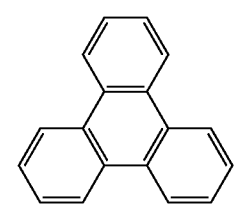 |

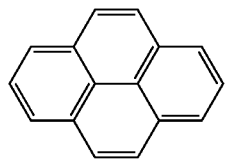
37

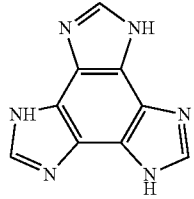

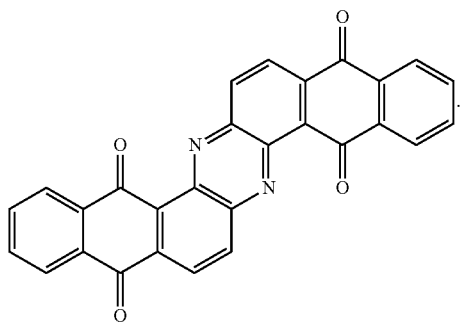
41

-continued

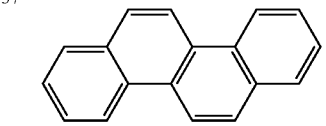
38

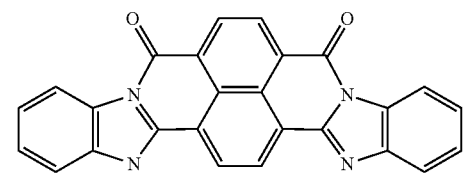
40

28. A self-healing capacitor according to claim 27 wherein the modifying functional groups are selected from the group consisting of alkyl, aryl, substituted alkyl, and substituted aryl.

29. A self-healing capacitor according to claim 1, wherein the dielectric layer comprise a compound selected from the group consisting of fluorinated alkyls, polyethylene, polyparaphenylene terephthalamide, poly(vinylidene fluoride-hexafluoropropylene), polypropylene, fluorinated polypropylene, and polydimethylsiloxane.

30. A self-healing capacitor according to claim 1, wherein the dielectric layer comprises a polymeric material formed on the basis of water-soluble polymers which are selected from structures 42 to 47:

-continued

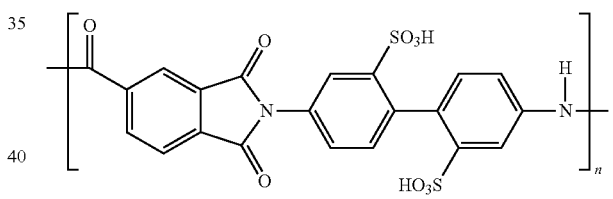
poly(2,2'-disulfo-4,4'-benzidine 1,3-dioxo-isoindoline-5-carboxamide)
44

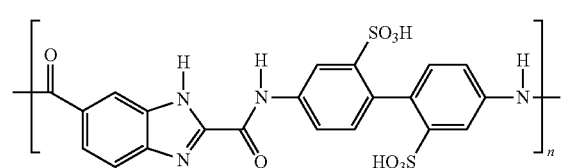
poly(2,2'-disulfo-4,4'-benzidine 1H-benzimidazole-2,5-dicarboxamide)
45

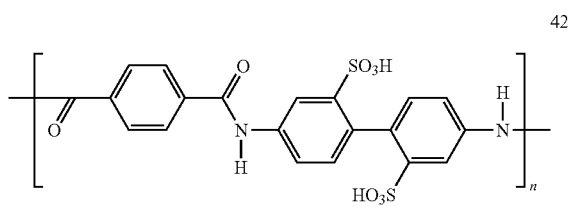
poly(2,2'-disulfo-4,4'-benzidine terephthalamide)
42

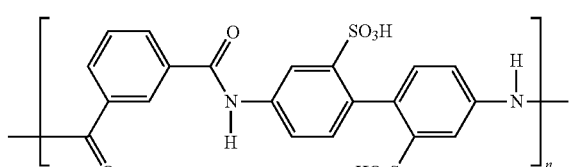
poly(2,2'-disulfo-4,4'-benzidine isophthalamide)
43

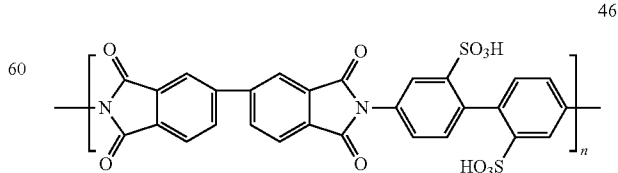
poly(2,2'-disulfo-4,4'-benzidine 3,3',4,4'-biphenyl tetracarboxylic acid diimide)
46

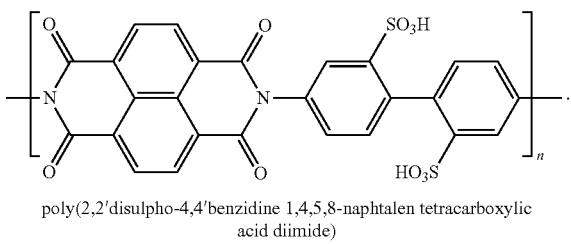

poly(2,2′disulpho-4,4′benzidine 1,4,5,8-naphtalen tetracarboxylic acid diimide)

31. A self-healing capacitor according to claim 1, wherein the dielectric layer comprises a polymeric material formed on the basis of polymers soluble in organic solvents which are selected from structures 48 to 53:

wherein each $R^1$ and $R^2$ is independently selected from alkyl, aryl, substituted alkyl, and substituted aryl.

32. A self-healing capacitor according to claim 1, wherein the dielectric layer is crystalline.

33. A self-healing capacitor according to claim 1, wherein the dielectric layer comprises a colloidal composite with a micro-dispersion of electro-conductive nano-particles in an insulator matrix.

34. A self-healing capacitor according to claim 33, wherein the electro-conductive nano-particles comprise electro-conductive oligomers.

35. A self-healing capacitor according to claim 34, wherein a longitudinal axis of each of the electro-conductive oligomers is directed perpendicularly in relation to an electrode surface.

36. A self-healing capacitor according to claim 34, wherein the electro-conductive oligomers are selected from structures 54 to 60:

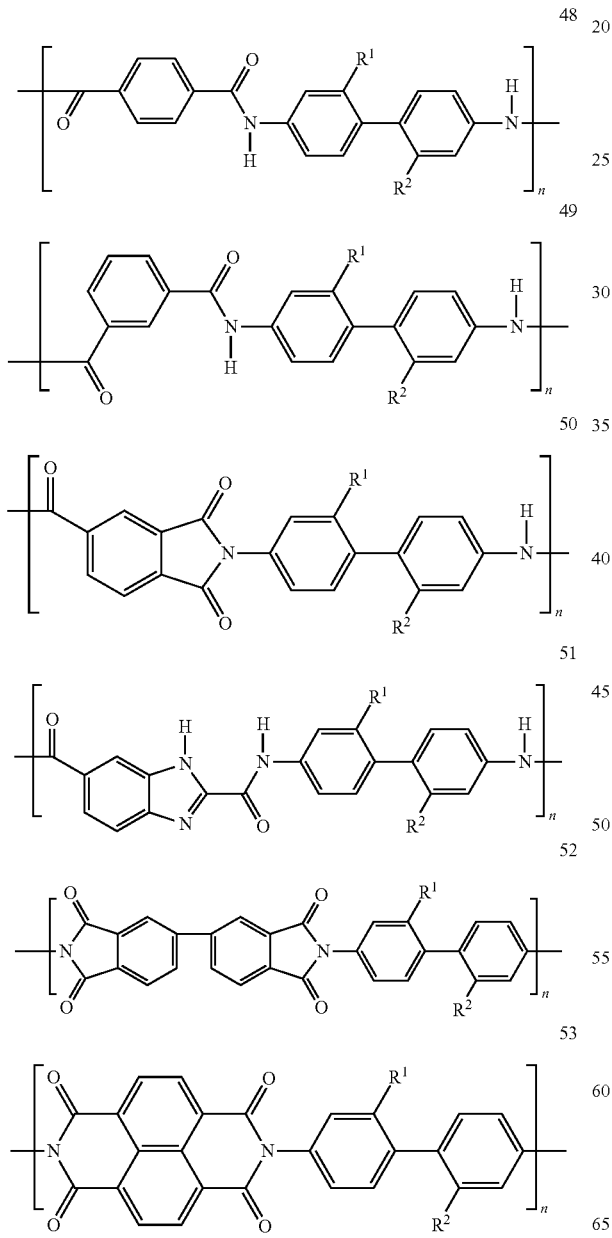

wherein X=2, 3, 4, 5, 6, 7, 8, 9, 10, 11 or 12.

37. A self-healing capacitor according to claim 34, wherein each of the electroconductive oligomers further comprises substitute groups and has the following general structural formula II:

$$\text{(electroconductive oligomer) } R_q \quad \text{(II)}$$

wherein R is a substitute group, and q is a number that is greater than or equal to zero.

38. A self-healing capacitor according to claim 37, wherein each R is independently an alkyl, aryl, substituted alkyl, or substituted aryl, and any combination thereof.

39. A self-healing capacitor according to claim 33, wherein a material of the insulator matrix is selected from the group consisting of poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyldicloro siloxane, dimethylsilane diol, and polydimethyl siloxane.

40. A self-healing capacitor according to claim 1, wherein said dielectric layer comprises a surfactant selected from: dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, and dobecyldimethylamine oxide.

41. A self-healing capacitor according to claim 1, wherein said dielectric layer comprises a material selected from the group consisting of oxides, nitrides, oxynitrides and fluorides.

42. A self-healing capacitor according to claim 1, wherein said dielectric layer comprises a material selected from the group consisting of $SiO_2$, $HfO_2$, $Al_2O_3$ and $Si_3N_4$.

43. A self-healing capacitor according to claim 1, wherein the first electrode and the second electrode comprise the metal foam.

44. A method of producing a self-healing capacitor, comprising:
   (a) applying an electric voltage across a first electrode and a second electrode that are separated by a dielectric layer, which applying comprises a gradual enhancement of the electric voltage to achieve electric breakdown, wherein at least one of the first and second electrodes includes a metal foam;
   (b) applying an electric field across the first electrode and the second electrode to form electrically conductive channels with exit points on opposing surfaces of the dielectric layer;
   (c) applying a current through the first and second electrodes to (i) induce Joule heating in at least one of the first and second electrodes and (ii) form local contact breakers in at least one of the first and second electrodes, which local contact breakers are formed adjacent or in proximity to the exit points; and
   (d) terminating the application of the current upon formation of the local contact breakers.

45. The method of claim 44, wherein the application of the current is terminated upon when a sufficient amount of metal has evaporated from at least one of the first and second electrodes to form the local contact breakers.

* * * * *